United States Patent
Golding

(10) Patent No.: US 6,192,332 B1
(45) Date of Patent: Feb. 20, 2001

(54) ADAPTIVE ELECTRONIC PHRASE BOOK

(75) Inventor: Andrew R. Golding, Cambridge, MA (US)

(73) Assignee: Mitsubishi Electric Research Laboratories, Inc., Cambridge, MA (US)

(*) Notice: Under 35 U.S.C. 154(b), the term of this patent shall be extended for 0 days.

(21) Appl. No.: 09/056,036

(22) Filed: Apr. 6, 1998

(51) Int. Cl.[7] ............................. G10L 15/22; G06F 17/28
(52) U.S. Cl. ............................. 704/2; 704/10; 704/277
(58) Field of Search .................... 704/2, 3, 4, 5, 704/7, 8, 10, 270, 277, 235, 260; 378/88.05, 88.06

(56) References Cited

U.S. PATENT DOCUMENTS

| | | | |
|---|---|---|---|
| 4,393,460 | * | 7/1983 | Masuzawa et al. ............... 704/3 |
| 4,916,730 | * | 4/1990 | Hashimoto ................. 379/88.28 |
| 5,295,070 | * | 3/1994 | Justice ............................... 704/2 |
| 5,724,526 | * | 3/1998 | Kunita ........................... 704/277 |
| 5,765,131 | * | 6/1998 | Stentiford et al. ............ 704/277 |
| 5,826,220 | * | 10/1998 | Takeda et al. .................... 704/7 |
| 5,854,997 | * | 12/1998 | Sukeda et al. .................... 704/3 |
| 5,875,422 | * | 2/1999 | Eslambolchi et al. ............ 704/3 |
| 5,915,001 | * | 6/1999 | Uppaluru ................... 379/88.22 |
| 5,943,398 | * | 8/1999 | Klein et al. ................ 379/88.13 |
| 5,966,685 | * | 10/1999 | Flanagan et al. ................ 704/8 |
| 5,991,711 | * | 11/1999 | Seno et al. ....................... 704/3 |

* cited by examiner

*Primary Examiner*—David R. Hudspeth
*Assistant Examiner*—Martin Lerner
(74) *Attorney, Agent, or Firm*—Dirk Brinkman

(57) ABSTRACT

A system is provided which translates phrases from a source language to a target language, and which includes means for continually updating the set of phrases that are known and translatable by the system so as to ensure that the set of phrases accurately reflects the sentences that users most frequently ask to have translated.

8 Claims, 3 Drawing Sheets

ADAPTIVE ELECTRONIC PHRASE BOOK

FIELD OF THE INVENTION

This invention relates to a handheld electronic device which translates phrases from a source language to a target language via lookup in a translation table, and more particularly to one which possesses the capability to record its translation failures in a non-volatile memory, and establish Internet connections with a central maintenance site so as to update its translation table in such a way as to reduce translation failures in the future.

BACKGROUND OF THE INVENTION

Travellers in a foreign country who do not speak the local language typically rely on conventional printed phrase books to be able to communicate with the natives of said foreign country. Flipping through the pages of a phrase book to find a desired phrase, however, can be frustrating for both the speaker and the listener, both of whom are accustomed to considerably faster conversational rates. In addition, once the speaker finds the desired phrase in the phrase book, said speaker may experience difficulty in pronouncing the phrase in a comprehensible way.

The aforementioned shortcomings of printed phrase books have led to the development of electronic phrase books or translation devices, which allow the user to directly enter a phrase to be translated either via a hand-operated input device, such as a keyboard, or by speaking into a microphone connected to a speech-recognition system. Regardless of the input device being utilized, the user is able to directly specify the phrase to be translated, thereby relegating to the translation device the tedious chore of looking up the phrase in a translation table. In addition, certain electronic translation devices include means for reading their translations aloud via a speech-synthesis system connected to a loudspeaker, thereby alleviating any potential difficulties on the part of the user in pronouncing the phrases intelligibly. One example of an electronic phrase book is the Voice Language Translator described by Rondel et al. in U.S. Pat. No. 4,984,177, granted Jan. 8, 1991. This voice language translator includes means for recognizing a phrase spoken by the user, for looking up the phrase in a translation table, and for speaking aloud the resulting translation of the phrase.

It is important to realize, however, that all existing phrase books, whether printed or electronic, suffer from a common, severe flaw: they often fail to contain the phrases that users wish to say. For example, one may find oneself in a department store in a foreign country, and in search of a cash register at which to make one's purchase; but few phrase books provide a translation for the natural phrase to utter in this context, namely, "Where's the nearest cash register?". A multitude of other seemingly natural phrases are absent from surprisingly many phrase books, such as, "Where is the nearest ATM?", "Is it on the Star system?", "Do you have change for a 100-franc note?", "Is there a gym nearby?", "How much is a weekly pass?", "Do you have skim milk?", "How do I get to the Olympic Village?", "What time do the games start?", and so on. From the point of view of the author of the phrase book, it is extremely difficult to correctly anticipate the most common, say, 1000 phrases that travellers will need. The difficulty stems from two sources: first, it is difficult to predict what sorts of activities and artifacts travellers generally talk about. Second, travellers' communicative needs change over time, particularly in the face of new events, such as the Olympics, and new tourist attractions, such as a new Disney theme park.

SUMMARY OF INVENTION

The present invention addresses the difficulty of anticipating which phrases will be needed by utilizing a translation table that can be continually modified or updated in response to translation failures. Thus it no longer becomes critical to identify the 1000 most commonly used phrases. The device may be programmed with any set of phrases initially, for example, the set of phrases found in a conventional paper phrase book. Then, during usage, the device records all cases in which the user asks for the translation of a phrase that is not in the book. These translation failures are later uploaded to a central maintenance site, where human translators provide translations for the most frequently-requested phrases. These updates are in turn downloaded to the device, thereby bringing the set of phrases known by the phrase book into alignment with the set of phrases that have been observed in actual practice to be most needed by users.

Travellers and others utilize the subject system to translate a phrase through the following procedure: The user specifies, via an input device, a phrase in the source language to be translated by the system. The system looks up the phrase in a translation table. If the phrase is not found, the system reports failure, otherwise the system displays for the user the one or more translations of the phrase that are found in said table. If the user accepts one of the translations, the system returns the accepted translation via an output device, otherwise the system reports failure. The system records all failures in an error table, which resides in non-volatile memory. The system additionally records all successful translations by keeping a usage count for each translation in non-volatile memory. The user may, at any time, establish an Internet connection between the system and a central maintenance site for the purpose of receiving updates to the system's translation table. During the connection, the central maintenance site, in addition to downloading updates to the system's translation table, also uploads the system's aforementioned error table and usage counts. The central maintenance site is thereby able to maintain statistics, aggregated over all instances of the system, about which translations not already present in the translation table are most strongly needed, and which translations already present in the translation table are most superfluous. These statistics are utilized in deciding which translations to include in subsequent updates, and which translations to remove to make room for new translations in the translation table.

BRIEF DESCRIPTION OF THE DRAWINGS

These and other features of the Subject Invention will be better understood in relation to the Detailed Description taken in conjunction with the Drawings, of which.

DETAILED DESCRIPTION

Figure 1A:
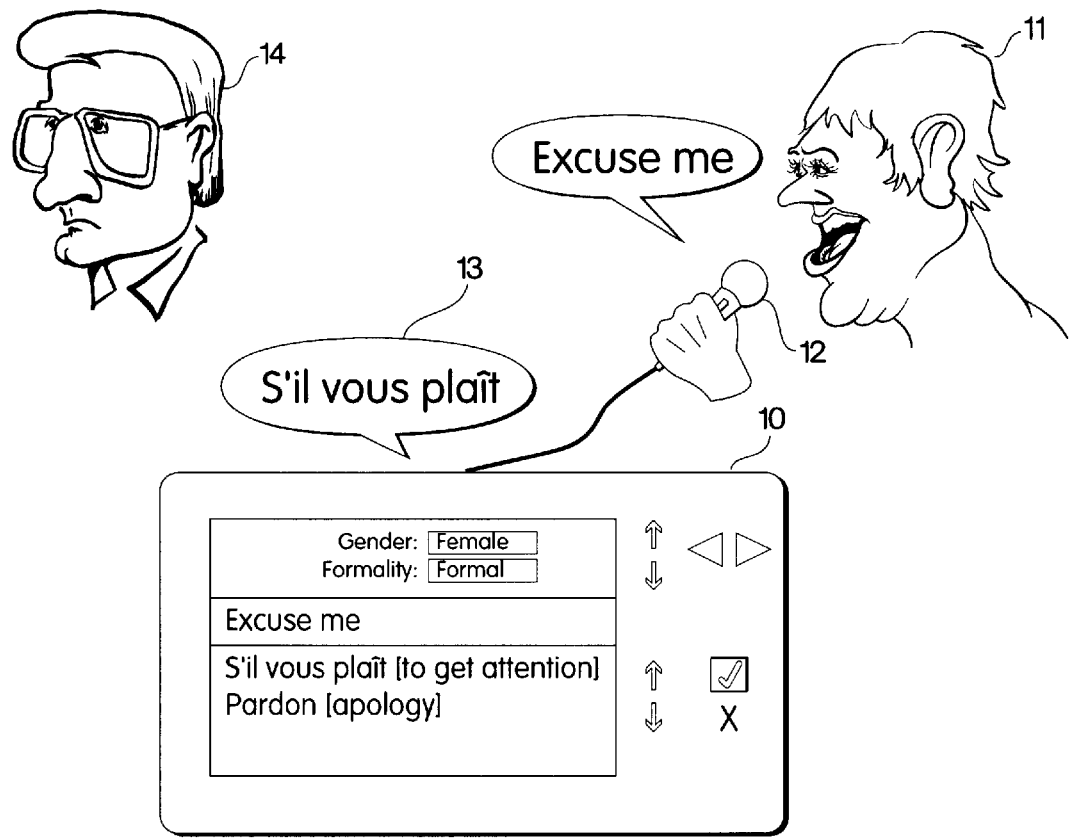
FIG. 1a is a diagrammatic representation of a traveller utilizing the subject phrase translator when seeking to communicate in a foreign country.

Referring now to FIG. 1a, a handheld adaptive electronic phrase book 10 is used by an individual 11 to translate a desired phrase in that individual's native language into an equivalent phrase in a target language. In one embodiment, phrase book 10 contains a microphone 12 and a speech-recognition system (not shown) which enable the individual to specify the desired phrase by speaking it into the microphone. Through look-up in a translation table, phrase book 10 translates the phrase into the target language. In one embodiment, phrase book 10 reads aloud the resulting translation through the utilization of a speech synthesizer and loudspeaker as illustrated at 13. The subject system thereby provides individual 11 with a way of immediately communicating with individual 14 who speaks a different language.

Figure 1B:
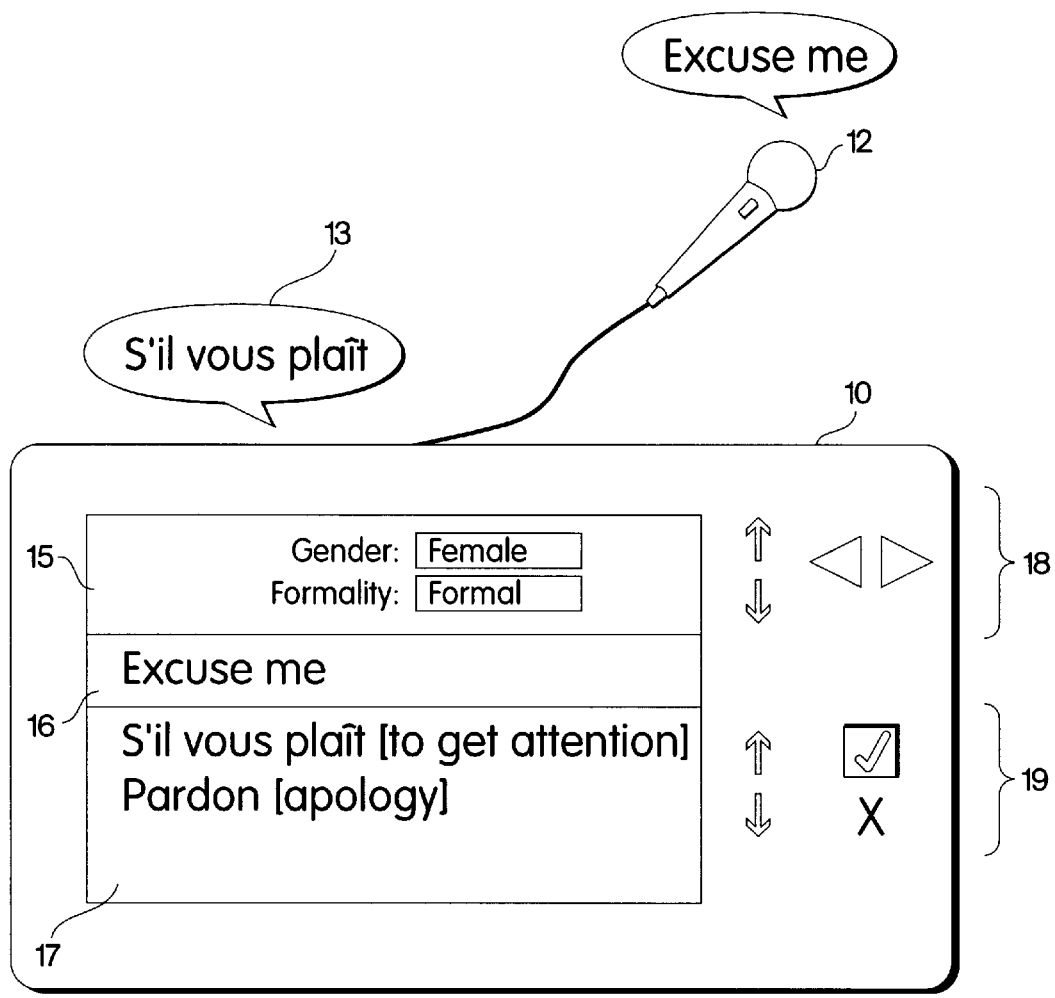
FIG. 1b is a diagrammatic representation illustrating the adaptive electronic phrase book of FIG. 1a, including illustrations of the control buttons for the operation thereof; and, FIG. 2 is a block diagram of the subject system.

As will be seen from FIG. 1b, the phrase book displays a variety of information to the user via a graphical display divided into three regions 15, 16, and 17. Region 15 of the graphical display shows information about the conversational context, as needed to perform accurate translations from the user's native language to the desired target language. For example, when translating from English to French, two pieces of information that are needed are the user's gender, i.e., male or female, and the level of formality with which the user wishes to address the listener, i.e., formal or familiar. The gender information is used when translating a phrase such as "I am happy", which in French becomes either "Je suis heureux" for a male speaker, or "Je suis heureuse" for a female speaker. The formality information is used when translating a phrase such as "Please", which in French becomes either "S'il vouis plaît" in the formal case, or "S'il te plaît" in the familiar case.

Region 16 of the graphical display shows the phrase spoken by the user prior to translation. This information enables the user to know whether the phrase to be translated has been properly understood by phrase book 10.

Region 17 of the graphical display shows a series of one or more translations of the phrase in the target language, as obtained via look-up in a translation table. It will be appreciated that a multiplicity of possible translations will result whenever a phrase in the user's language lacks a unique translation in the target language. For example, the English phrase "Excuse me" may be translated into French as "S'il vous plaît" if the speaker, addressing the listener formally, wishes to get the listener's attention, or as "Pardon" if the speaker wishes to apologize to the listener, e.g., for accidentally bumping into the listener. Each such translation is presented in region 17 together with an explanation in the user's language as to when that particular translation is most appropriate.

User input to the phrase book, apart from the entry of phrases to translate, is performed through two banks of control buttons 18 and 19. Bank 18 consists of four buttons that allow the user to enter the information about the conversational context that is displayed in region 15, such as the user's gender. More particularly, the up-arrow and down-arrow buttons allow the user to scroll up and down the list of displayed information, thereby selecting a particular piece of information to be updated. The currently selected piece of information is indicated, in one embodiment, through the use of a highlighting cursor, as shown for example in FIG. 1b by the highlighting cursor on "Gender" in region 15. The left and right arrow buttons allow the user to cycle backwards or forwards, respectively, through the list of possible values for the selected piece of information. For example, when "gender" is selected, the left and right arrow buttons cycle through a list of two values: "male" and "female".

Bank 19 consists of four buttons that allow the user to select the desired translation from among the multiplicity of translations presented in region 17. The up-arrow and down-arrow buttons are utilized to scroll up and down the list of translations to select the translation of choice. In one embodiment, the currently selected translation is shown in region 17 through the use of a highlighting cursor, as in FIG. 1b where the first translation, "S'il vous plaît", is highlighted. Once the desired translation has been selected, the user may press the accept button, shown in FIG. 1b as the button with a check mark in bank 19, to indicate acceptance of the selected translation. When a selected translation has been accepted by the user, the system, in one embodiment, reads the selected translation aloud, as illustrated at 13, utilizing a speech-synthesis system connected to a loudspeaker, and thereby enabling individual 14 who does not speak the user's language to understand the desired phrase regardless of the user's ability or lack thereof to speak the target language.

In the event that the user decides that none of the translations provided by the system is appropriate, he or she may depress the reject button, shown in FIG. 1b as the button with an X mark in bank 19, signifying rejection of all translations. The user may also depress the reject button after previously accepting a particular translation, but then observing that this translation is not properly understood by individual 14.

It is a feature of the subject invention that phrase book 10 is adaptive in the sense that the set of phrases available for translation is changed so as to reduce the number of translation failures. How this is accomplished is as follows: the subject invention keeps records of every translation request and the associated success or failure of the request. A request succeeds if the user depresses the accept button and does not subsequently depress the reject button. A request fails if the phrase entered by the user is not found in the system's translation table, or if the user depresses the reject button. This information is kept in a non-volatile memory. At times chosen by the user, an Internet connection is established between phrase book 10 and a central maintenance site (not shown), which allows the central maintenance site to collect the records about translation requests, which are then used to determine the most effective new phrases to be added to the translation table used by phrase book 10, as well as to determine which phrases are used least often, and thus may be deleted with impunity to make room for new phrases to be added. In one embodiment, this is accomplished off-line in the sense that when user 11 requires a more up-to-date translation table, he or she causes phrase book 10 to be connected to the central maintenance site, at which time the translation table used by the phrase book is updated based on the success/failure records from similar phrase books so that the user is presented with the aggregate knowledge derived from a multiplicity of phrase-book users.

As will be appreciated, the set of most common phrases that individuals need to communicate in a particular foreign language will be effectively learned as an unobtrusive side effect of using the electronic phrase book. Commonly-needed phrases that are absent or mis-translated in the phrase book will show up as common translation failures, and will thus be detected at the central maintenance site as important phrases to add to the phrase book. The phrase book, with its ability to collect failure data from a multiplicity of users, and propagate the resulting corrections to said users, is thereby able to adapt to users' needs, ensuring that it provides translations of precisely those phrases that are most often needed by individuals trying to communicate in the given foreign language.

Figure 2:
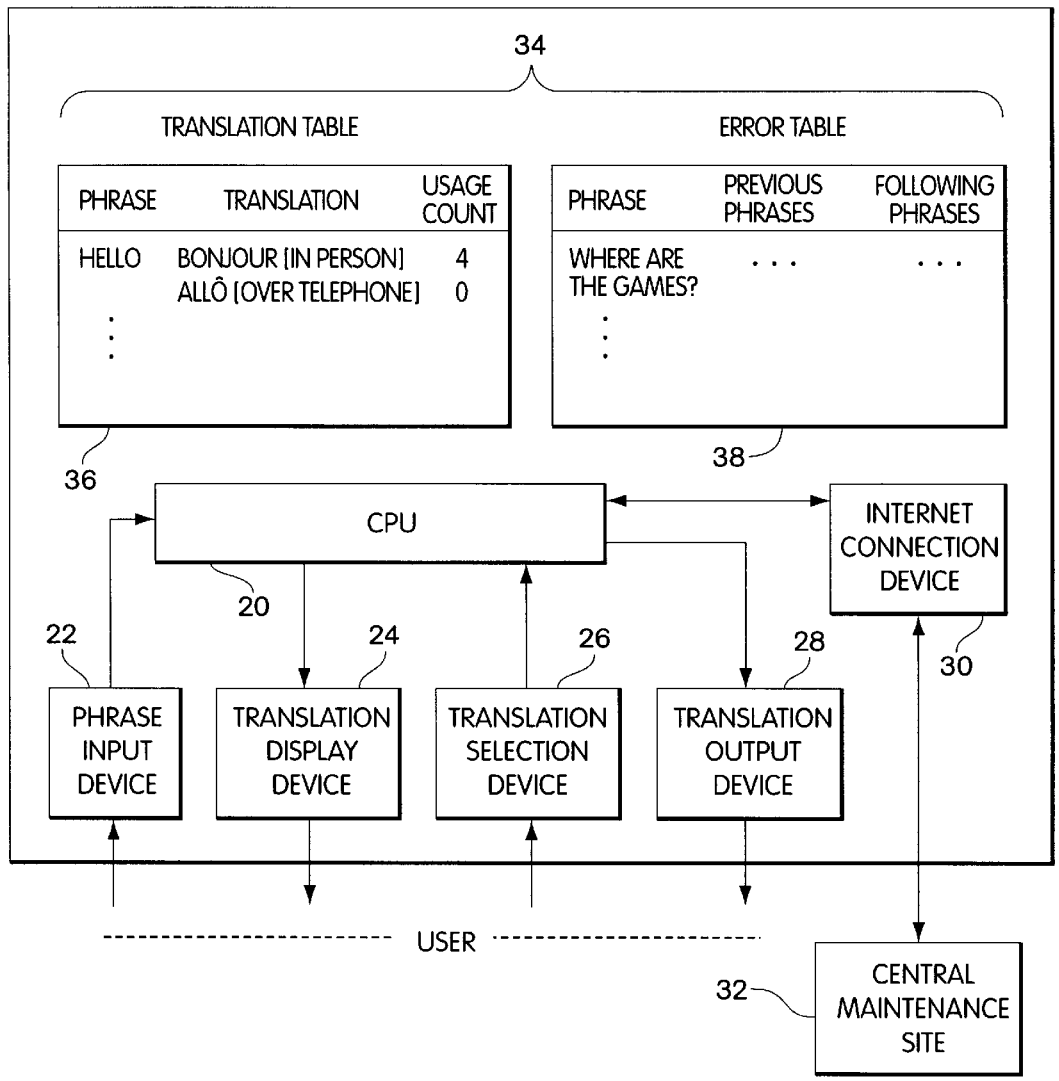

FIG. 2 shows the architecture of the present invention. The system includes a central processing unit, or CPU 20, which is programmed to perform the operations described herein. The system also includes four modules for communication with the user: a phrase input device 22, which allows the user to enter a phrase to be translated; a translation display device 24, which displays to the user one or more translations of the phrase that the user entered; a translation selection device 26, which allows the user to select one of the displayed translations; and a translation output device 28, which allows the system to return the selected translation to the user. The subject system further includes an Internet connection device 30, which allows the user to establish a connection between the system and a central maintenance site 32. The subject system lastly includes a non-volatile memory 34 in which are stored a translation table 36 and an error table 38.

In operation, the subject system is used to translate a phrase through the following procedure: the user enters a phrase to be translated via phrase input device 22. In the preferred embodiment, said phrase input device consists of a microphone connected to a continuous speech-recognition system (not shown). In this embodiment, the user enters a phrase by speaking it into a microphone. In other embodiments, said phrase input device may be a keyboard, an electronic writing tablet connected to a handwriting recognition system, or any other system that allows the user to specify a phrase of text.

Upon receiving a phrase to be translated from phrase input device 22, the CPU 20 looks up the phrase in translation table 36. The translation table, stored in non-volatile memory, consists of a list of entries, each giving a phrase in the source language, a set of possible translations for the phrase in the target language, and a usage count which records the number of times each translation was utilized. If said phrase is not found in the translation table, CPU 20 reports failure to the user via a phrase display device 24. In addition, CPU 20 records the failure in error table 38, which resides in non-volatile memory. The entry for the failure in the error table consists of the phrase that caused the failure, together with the several phrases entered by the user prior to and following the failure, which provide context for subsequently understanding what the user intended to convey with the phrase that caused the failure. Because the phrases following the failure are not yet known at the time the failure is encountered, these phrases are filled in after the initial entry for the failure is created.

If lookup in the translation table of the phrase entered by the user is successful, then CPU 20 obtains from the translation table a set of one or more possible translations of the phrase. It will be appreciated that the translation of a given phrase from the source language to the target language will sometimes be ambiguous, and thus will, in such circumstances, result in multiple possible translations. For example, the English phrase "Excuse me" may be translated into French as "S'il vous plaît", if the speaker, addressing the user formally, wishes to get the listener's attention, or it may be translated as "Pardon", if the user wishes to apologize to the listener, e.g., for accidentally stepping on the listener's foot. CPU 20 displays the one or more possible translations of said phrase to the user via translation display device 24. In one embodiment, this translation display device consists of a scrollable, multiple-line LCD display, which allows the system to enumerate each possible translation.

The user may select the desired translation, if any, from among the list of possible translations displayed. The selection is entered via translation selection device 26, which, in one embodiment, consists of four buttons and a highlighting cursor. The cursor is positioned initially on the first translation in the list, but can be moved to any other translation through the use of up-arrow and down-arrow buttons, which also automatically scroll the text in the display as needed. When the cursor is positioned on the desired translation, the user may select said translation by pressing the accept button, or, if no translation is acceptable, the reject button. In the event that the user presses the accept button, CPU 20 returns the translation selected by the user via the translation output device. In the preferred embodiment, said translation output device consists of a speech-synthesis system for the target language connected to a loudspeaker. In this embodiment, the system reads the selected translation aloud to the user. In addition to returning the selected translation to the user, CPU 20 also increments the usage count in the translation table for the selected translation, thereby keeping track of how many times each translation in the translation table was utilized.

Alternatively, in the event that the user presses the reject button, the CPU treats the translation as a failure and adds an entry to its aforementioned error table.

It will be appreciated that by maintaining the aforementioned error table in non-volatile memory, the system collects useful information as to which phrases are spoken by users but either have no entry in the aforementioned translation table, or have an entry that lacks the desired translation. It will further be appreciated that by maintaining the aforementioned usage counts in the aforementioned translation table, the system collects useful information as to how many times the translations in the aforementioned translation table are utilized.

At any time, the user may establish an Internet connection between the system and a central maintenance site, via Internet connection device 30. In one embodiment, this Internet connection device consists of an internal modem with a modular telephone plug and a telephone dialer which can dial up the central maintenance site. During the connection, central maintenance site 32 uploads the system's translation table and error table, downloads an updated version of said translation table to the system, and resets said error table to be empty. By being the central repository to which all instances of the system connect, the central maintenance site is able to collect aggregate statistics about which phrases are missing from the translation table but are most often requested, which phrases are present in the translation table but lack the desired translation, and which phrases are present in the translation table but rarely or never used. This aggregate information is utilized by the central maintenance site to determine which translations should be added to or removed from the system's translation table. When new translations are needed, they are obtained by asking human translators. The aforementioned procedure of collecting statistics of translation failures and successes, and updating the translation table accordingly, enables the subject system to successfully adapt the set of phrases in the translation table so as to ensure that the most useful phrases are included.

Having above indicated several embodiments of the Subject Invention, it will occur to those skilled in the art that modifications and alternatives can be practiced within the spirit of the invention. It is accordingly intended to define the scope of the invention only as indicated in the following claims:

What is claimed is:

1. An adaptive electronic phrase book, comprising:
    a speech decoder for decoding spoken language and for providing a text representation of a spoken phrase;

a microphone coupled to said speech decoder for picking up said spoken phrase;

a display for displaying said text representation;

a translation table that maps a plurality of phrases in the speaker's language to their foreign-language equivalents;

means for the user to specify predetermined characteristics of the conversational context;

means responsive to said text representation and said predetermined conversational context, and coupled to said display for looking up said text representation in said translation table and returning to said display a text representation of at least one foreign language equivalent of said phrase;

means for selecting at least one of said foreign language equivalents as the foreign language equivalent phrase to be announced;

means for announcing said selected foreign language equivalent phrase; and, means for updating said translation table to assure that said table contains at all times the set of phrases most frequently needed by users.

2. The phrase book of claim 1, wherein said updating means includes means for coupling said updating means to the Internet, a central server coupled to the Internet, and means for downloading an updated translation table to said updating means from said server based on the selection history of a plurality of said phrase books.

3. An adaptive electronic phrase book, comprising:

a speech decoder for decoding spoken language and for providing a digital representation of a spoken phrase;

a microphone coupled to said speech decoder for picking up said spoken phrase;

a display for displaying said digital representation;

means responsive to said digital representation and coupled to said display for returning to said display a digital representation of at least one foreign language equivalent of said phrase;

means for selecting at least one of said foreign language equivalents as the foreign language equivalent phrase to be announced;

means for announcing said selected foreign language equivalent phrase; and, means for updating said foreign language phrase returning means to assure the return of a correct foreign language phrase.

4. The phrase book of claim 3, wherein said correct foreign language phrase is colloquially correct.

5. The phrase book of claim 4, wherein said updating means includes means coupled to said selecting means to alter the foreign language equivalent phrase returned by said selecting means responsive to a previous selection history.

6. The phrase book of claim 5, and further including means coupled to said updating means for coupling said updating means to the Internet, a central server coupled to the Internet and means for downloading updated foreign language phrases to said updating means from said server based on at least the selection history of one of said phrase books.

7. The phrase book of claim 3 and further including means for overriding said selective means to automatically announce a predetermined foreign language equivalent phrase.

8. The phrase book of claim 3, wherein said announcing means is automatic if a selection is not made.

* * * * *